United States Patent
Jonnagadla et al.

(10) Patent No.: US 9,038,091 B2
(45) Date of Patent: May 19, 2015

(54) METHODS AND SYSTEMS FOR DYNAMICALLY ESTABLISHING ONE OR MORE CONNECTIONS BETWEEN A SOFTWARE APPLICATION AND A CLUSTER OF MESSAGE BROKER

(75) Inventors: Suresh S. Jonnagadla, Laurel, MD (US); Robert G. Daugherty, Los Angeles, CA (US); Shailender K. Gola, North Potomac, MD (US); Ha Tam Nham, Laurel, MD (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 282 days.

(21) Appl. No.: 13/217,988

(22) Filed: Aug. 25, 2011

(65) Prior Publication Data
US 2013/0055288 A1 Feb. 28, 2013

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *G06F 9/50* | (2006.01) |
| *G06F 9/54* | (2006.01) |

(52) U.S. Cl.
CPC ............... *G06F 9/505* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 7,706,373 B2* | 4/2010 | Xu et al. | 370/392 |
| 2002/0064126 A1* | 5/2002 | Bhattal et al. | 370/217 |
| 2003/0105800 A1* | 6/2003 | Cullen | 709/201 |
| 2006/0075045 A1* | 4/2006 | Wei et al. | 709/206 |
| 2010/0333111 A1* | 12/2010 | Kothamasu et al. | 719/313 |

* cited by examiner

*Primary Examiner* — Craig Dorais

(57) ABSTRACT

An exemplary method includes a broker-based messaging system detecting a request provided by a software application for the software application to connect to any one of a plurality of brokers included in a cluster of brokers, dynamically identifying, in response to the request and in accordance with a connection distribution heuristic, a broker included in the cluster of brokers and that is available for connection to the software application, and attempting to establish a connection between the software application and the broker. Corresponding methods and systems are also disclosed.

16 Claims, 15 Drawing Sheets

700

Broker Information Table

| Broker Name | Location IP Address | Location Port Number |
|---|---|---|
| Broker A | 111.191.221.65 | 7123 |
| Broker B | 155.159.211.39 | 4554 |
| Broker C | 122.125.135.145 | 3778 |
| Broker D | 165.167.169.19 | 3434 |

Cluster Information Table

| Cluster Name | Broker Names |
|---|---|
| Cluster A | Broker A, Broker B, Broker C |
| Cluster B | Broker A, Broker X |
| Cluster C | Broker B, Broker C |
| Cluster D | Broker Y, Broker X |

900

Software Application Information Table

| Software Application Name | Associated Broker Name | Registration Type |
|---|---|---|
| AZ | Broker A | Static |
| AY | Broker C | Static |
| AX-1 | Broker A | Dynamic |
| AX-2 | Broker B | Dynamic |
| AX-3 | Broker C | Dynamic |
| AX-4 | Broker A | Dynamic |
| AX-5 | Broker A | Dynamic |
| AX-6 | Broker B | Dynamic |
| AX-7 | Broker C | Dynamic |
| AX-8 | Broker A | Dynamic |
| AX-9 | Broker B | Dynamic |

Fig. 9

METHODS AND SYSTEMS FOR DYNAMICALLY ESTABLISHING ONE OR MORE CONNECTIONS BETWEEN A SOFTWARE APPLICATION AND A CLUSTER OF MESSAGE BROKER

BACKGROUND INFORMATION

Message-oriented middleware is infrastructure that increases the interoperability, portability, and flexibility of software applications by allowing the software applications to communicate one with another by transmitting messages therebetween. Message-oriented middleware reduces the complexity of developing software applications that span multiple operating systems and network protocols by insulating application developers from the details of the various operating system and network interfaces. Accordingly, software developers can more easily integrate new software applications with existing software applications.

In typical message-oriented middleware configurations, messages are transmitted from one software application to another by way of one or more message brokers ("brokers"). However, before a software application can transmit a message by way of a broker, it has to establish a connection (e.g., a TCP/IP connection) with the broker. Unfortunately, brokers have various capacity and resource limitations. For example, some brokers cannot handle more than a certain number (e.g., two thousand) of concurrent connections.

These limitations can be problematic for a software application that needs to establish multiple concurrent connections with a broker (e.g., in order to concurrently communicate with multiple software applications). For example, a particular software application may need to establish thousands of concurrent connections with a broker. In so doing, the broker may become overloaded, fail, or otherwise enter into a fault state in which it is unable to relay messages to and from software applications associated therewith. An inoperable broker can cause undesirable delays, consume valuable network resources, and result in frustrating experiences for end users who rely on the software applications associated with the broker.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 7 shows an exemplary broker information table according to principles disclosed herein.

FIG. 9 shows an exemplary software application information table according to principles disclosed herein.

DETAILED DESCRIPTION OF PREFERRED EMBODIMENTS

Methods and systems for dynamically establishing one or more connections between a software application and a cluster of message brokers ("brokers") are described herein. As will be described in more detail below, a broker-based messaging system may detect a request provided by a software application for the software application to connect to any one of a plurality of brokers included in a cluster of brokers, dynamically identify, in response to the request and in accordance with a connection distribution heuristic, a broker included in the cluster of brokers and that is available for connection to the software application, and attempt to establish a connection between the software application and the broker. If the attempt is successful, the broker-based messaging system may allow the application to transmit one or more messages by way of the established connection. If the attempt is unsuccessful, the broker-based messaging system may dynamically select and attempt to connect to one or more other brokers included in the cluster of brokers until a successful connection is established between the software application and a broker included in the cluster.

The methods and systems described herein may reduce or altogether eliminate the risk of a software application overloading a single broker with multiple concurrent connections by dynamically distributing the connections among a plurality of brokers included in a predetermined cluster of brokers. This is because each broker included in the cluster of brokers may be configured to operate in a similar manner (i.e., each broker may facilitate transmission of one or more messages between software applications). Hence, a software application may establish a connection with any of the brokers included in a cluster of brokers in order to communicate with another software application.

As used herein, the term "software application" may include, but is not limited to, a software product (e.g., a software program), a module within a software product, and/or any other software component (e.g. an enterprise java bean, a servlet, etc.) as may serve a particular implementation. As used herein, an "originating software application" is one that generates a message to be sent to another software application (referred to herein as a "recipient software application"). A software application may be executed by one or more computing devices.

As used herein, a "message" generated by a software application may include any data that may be read or otherwise processed by a message broker and/or a recipient software application. A message may be transmitted in encrypted form, as cleartext (i.e., non-encrypted form), and/or in any other manner as may serve a particular implementation.

Figure 1:
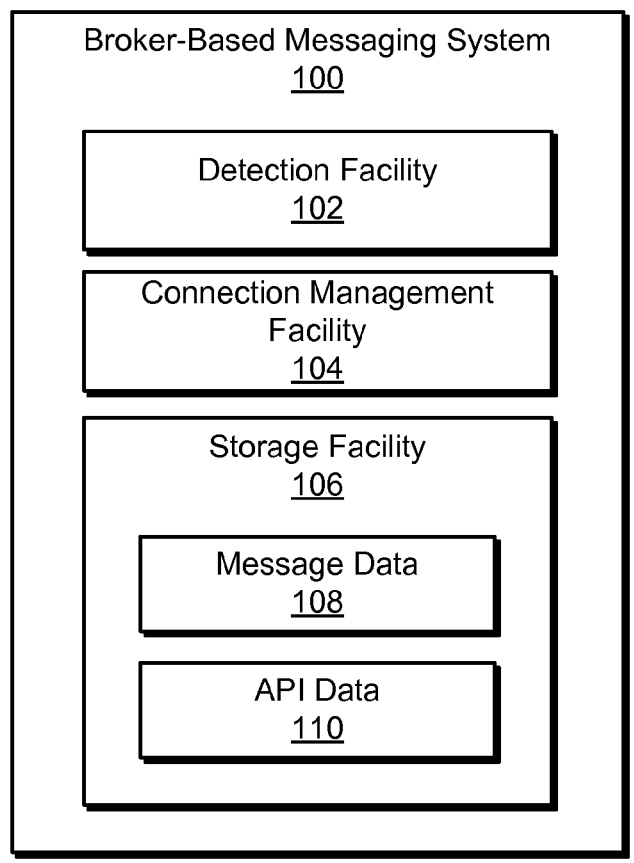
FIG. 1 illustrates an exemplary broker-based messaging system according to principles disclosed herein.

FIG. 1 illustrates an exemplary broker-based messaging system 100 ("system 100"). As shown, system 100 may include, without limitation, a detection facility 102, a connection management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect a request provided by a software application for the software application to connect to any one of a plurality of brokers included in a cluster of brokers. This may be performed in any suitable manner. For example, the connection request provided by the software application may be detected locally (e.g., by one or more application programming interfaces ("APIs") residing on a computing device that executes the software application). Additionally or alternatively, the connection request may be detected remotely (e.g., by a global directory service ("GDS") subsystem or server located remotely from the software application). Examples of both approaches will be provided in more detail below.

Connection management facility 104 may be configured to perform one or more connection management operations associated with one or more software applications and one or more clusters of brokers. For example, in response to a connection request being detected by detection facility 102, connection management facility 104 may utilize a connection distribution heuristic to dynamically identify a broker included in a cluster of brokers and that is available for connection to the software application. As will be described in more detail below, the connection distribution heuristic utilized by connection management facility 104 may include either a de-centralized connection distribution heuristic wherein the broker is dynamically identified by the software application itself (i.e., by a computing device executing the software application) or a centralized connection distribution heuristic wherein the broker is dynamically identified by a GDS subsystem. Exemplary de-centralized and centralized connection distribution heuristics will be described in more detail below.

Once an available broker has been identified, connection management facility 104 may attempt to establish a connection between the software application and the identified broker. This may be performed in any suitable manner. For example, an API associated with the software application (e.g., an API included within the software application or otherwise implemented by a computing device executing the software application) may transmit a connection request directly to the identified broker, which may process and grant the connection request by allowing the API to establish any suitable type of connection between the software application and the broker.

The connection established between the software application and the broker may include any suitable type of connection as may serve a particular implementation. For example, the connection may include a secure connection (e.g., a secure sockets layer ("SSL") connection or a TCP/IP connection) or a non-secure connection (e.g., a non-SSL connection).

In some examples, the connection established between the software application and the broker may include a synchronous connection configured to facilitate synchronous messaging by the software application. In synchronous messaging, the software application sends a message to a recipient software application by way of a connection with a broker and waits for a response from the recipient software application before a subsequent message can be transmitted over the same connection. This makes the connection unusable until the response message is received. Alternatively, the connection established between the software application and the broker may include an asynchronous connection configured to facilitate asynchronous messaging by the software application. In asynchronous messaging, the software application does not have to wait for a response message before transmitting another message over the same connection to the broker.

Synchronous messaging protocols are desirous in many applications because they are relatively easier to implement and maintain than asynchronous messaging protocols. However, because synchronous messaging protocols do not allow a software application to concurrently transmit multiple messages by way of the same connection, a software application configured to implement a synchronous messaging protocol must establish multiple connections with one or more brokers to process concurrent messages. Hence, the methods and systems described herein may be beneficial for software applications that implement synchronous messaging protocols.

In some examples, connection management facility 104 may detect whether an attempt to establish a connection between a software application and a broker is successful. This may be performed in any suitable manner. For example, an API associated with the software application may detect that the broker has accepted a connection request from the software application and thereby determine that the connection has been successfully established. In response, connection management facility 104 may allow the software application to transmit one or more messages by way of the established connection. This also may be performed in any suitable manner. For example, an API associated with the software application may turn control of the established connection over to the software application so that the software application may transmit one or more messages by way of the established connection.

Alternatively, connection management facility 104 may determine that the attempt to establish a connection between the software application and the broker is unsuccessful. An unsuccessful attempt to establish a connection between the software application and the broker may be caused by any of a number of different factors. For example, the broker may become disabled or otherwise malfunction in between the time that is identified as being available for a connection and when an attempt to establish a connection with the broker is initiated. In response to an unsuccessful attempt to establish a connection between the software application and the broker, connection management facility 104 may automatically perform any suitable type of fail-over operation. For example, connection management facility 104 may dynamically identify another broker included in the cluster of brokers and that is available for connection to the software application and then attempt to establish a connection between the software application and the newly identified broker. This process may be repeated until a successful connection is established.

Storage facility 106 may be configured to maintain message data 108 and application programming interface ("API") data 110. It will be recognized that storage facility 106 may maintain additional or alternative data as may serve a particular implementation.

Message data 108 may include data representative of one or more messages generated and/or received by a software application. Message data 108 may additionally include delivery instructions corresponding to one or more messages. For example, message data 108 may include an identifier (e.g., a name or identification number) of an intended recipient software application and/or computing device that executes the recipient software application.

API data 110 is representative of one or more APIs configured to facilitate integration of one or more software applications executed by one or more computing devices with one or more brokers and/or one or more GDS servers. For example, one or more APIs implemented by one or more computing devices may interface with one or more software applications executed by the one or more computing devices to facilitate encryption of messages generated by the one or more software applications, communication with the one or more brokers and/or GDS servers (e.g., establishment of one or more connections with the one or more brokers and/or GDS servers), and/or any other function as may serve a particular implementation.

Figure 2:
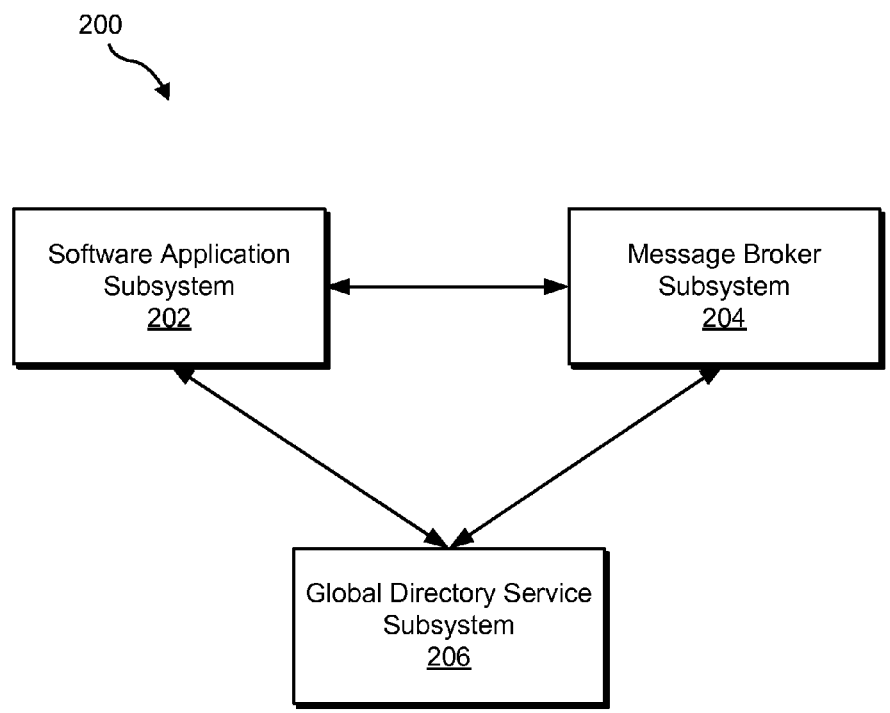
FIG. 2 illustrates an exemplary implementation of the system of FIG. 1 according to principles disclosed herein.

FIG. 2 illustrates an exemplary implementation 200 of system 100. As shown in FIG. 2, system 200 may include a software application subsystem 202, a message broker subsystem 204, and a global directory service ("GDS") subsystem 206 configured to communicate with one another. Software application subsystem 202 may be configured to maintain and/or execute a plurality of software applications, some of which may be functionally equivalent to one another. Message broker subsystem 204 may be configured to function as message-oriented middleware and facilitate delivery of one or more messages generated by one or more originating software applications to one or more recipient software applications. GDS subsystem 206 may be configured to maintain registration data associated with the software applications and message broker subsystem 204 so that message broker subsystem 204 may be able to determine how and where to deliver messages to the software applications.

Software application subsystem 202, message broker subsystem 204, and GDS subsystem 206 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Ethernet, and any other suitable communications technologies, devices, media, and protocols.

In some examples, software application subsystem 202, message broker subsystem 204, and GDS subsystem 206 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between software application subsystem 202, message broker subsystem 204, and GDS subsystem 206.

Figure 3:
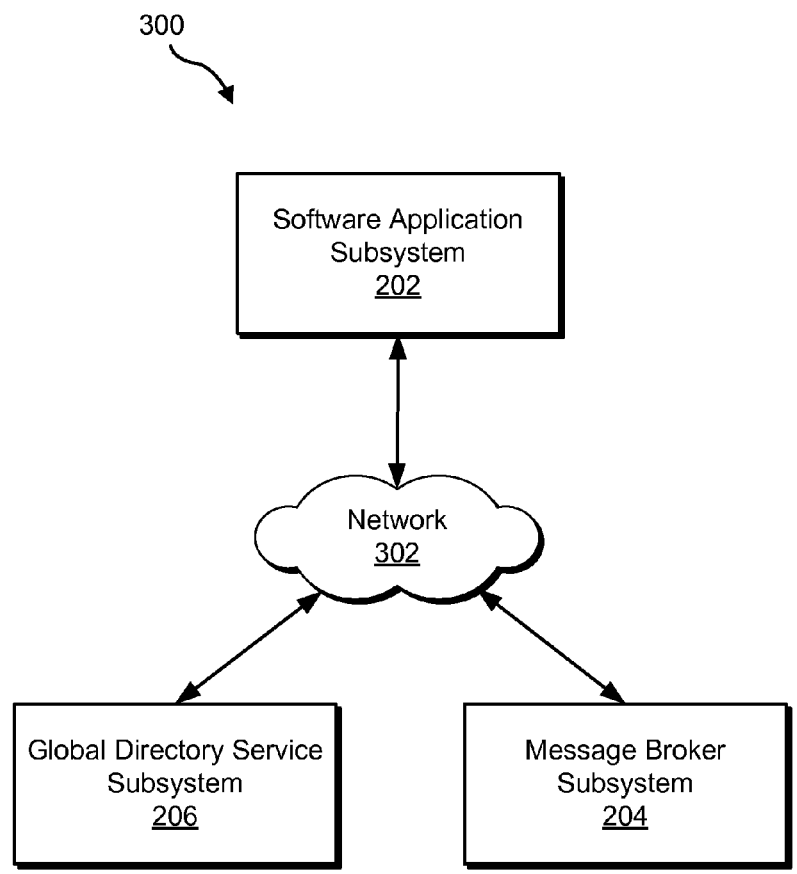
FIG. 3 illustrates another exemplary implementation of the system of FIG. 1 according to principles disclosed herein.

FIG. 3 shows an exemplary implementation 300 of system 100 wherein software application subsystem 202, message broker subsystem 204, and GDS subsystem 206 are communicatively coupled via a network 302. Network 302 may include one or more networks, including, but not limited to, any of the networks listed above. Communications between software application subsystem 202, message broker subsystem 204, and GDS subsystem 206 may be transported using any one of above-listed networks, or any combination or sub-combination of the above-listed networks. In some examples, software application subsystem 202, message broker subsystem 204, and/or GDS subsystem 206 may be implemented at least in part by one or more servers or other network-enabled devices.

Software application subsystem 202, message broker subsystem 204, and GDS subsystem 206 may each be implemented by one or more computing devices. For example, software application subsystem 202 may be implemented by one or more computing devices configured to execute an originating software application and one or more computing devices configured to execute a recipient software application. Alternatively, software application subsystem 202 may be implemented by a single computing device configured to execute both the originating and recipient software applications.

In some examples, software application subsystem 202, message broker subsystem 204, and GDS subsystem 206 are implemented by distinct computing devices. Alternatively, subsystems 202-206 may be implemented by the same computing device. Any other implementation of subsystems 202-206 may be realized in accordance with the systems and methods described herein.

In certain embodiments, system 100 may be implemented entirely by software application subsystem 202. For example, a computing device executing a software application may utilize one or more APIs to detect a request provided by a software application to connect to any one of a plurality of brokers included in a cluster of brokers, dynamically identify a broker included in the cluster of brokers and that is available for connection to the software application in accordance with a de-centralized connection distribution heuristic, and attempt to establish a connection between the software application and the broker. As will be described in more detail below, in order for software application subsystem 202 to entirely implement system 100, software application subsystem 202 may be configured to periodically acquire cluster information and broker information from GDS subsystem 202. The cluster information may identify a plurality of brokers included in the cluster of brokers, and the broker information may provide location information (e.g., an IP address, port number, etc.) for each of the plurality of brokers.

In alternative embodiments, system 100 may be at least partially implemented by GDS subsystem 206. For example, GDS subsystem 206 may detect (e.g., receive) a request provided by a software application (or an API associated with the software application) for the software application to connect to any one of a plurality of brokers included in a cluster of brokers, dynamically identify a broker included in the cluster of brokers and that is available for connection to the software application in accordance with a centralized connection distribution heuristic, and transmit broker information to the software application (or to an API associated with the software application). The software application (or a computing device executing the software application) may then utilize the broker information to attempt to establish a connection between the software application and the identified broker.

Various components and features of software application subsystem 202, message broker subsystem 204, and GDS subsystem 206 will now be described. It will be recognized that software application subsystem 202, message broker subsystem 204, and GDS subsystem 206 may each include additional or alternative components as may serve a particular implementation.

Figure 4:
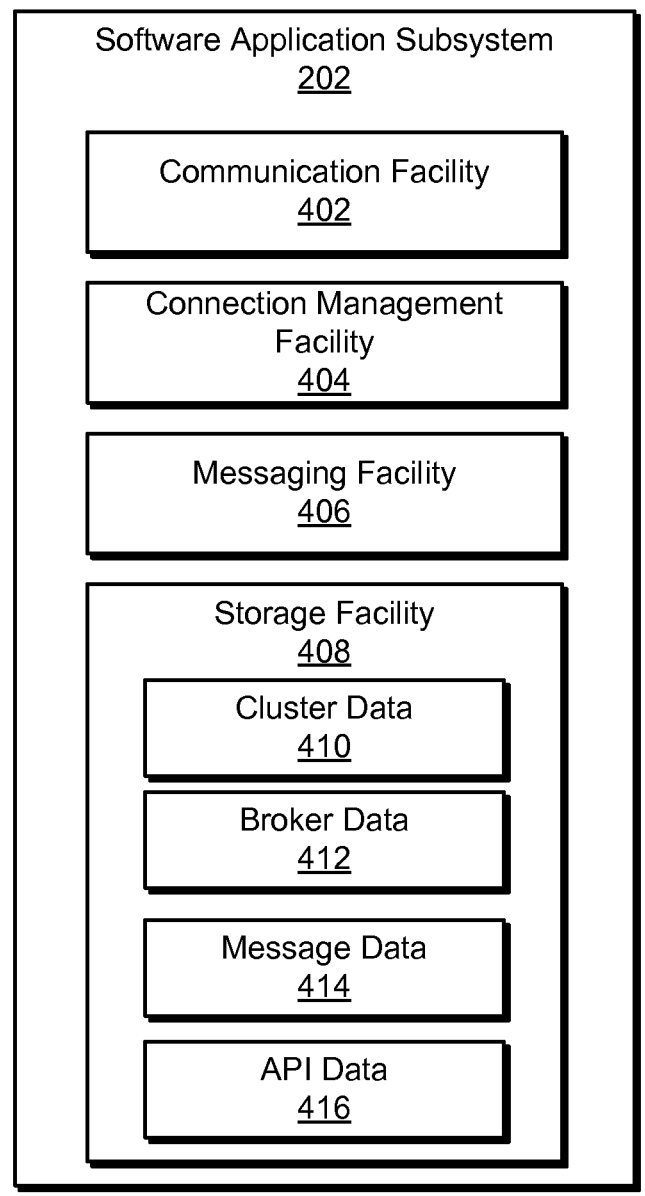
FIG. 4 illustrates exemplary components of a software application subsystem according to principles disclosed herein.

FIG. 4 illustrates exemplary components of software application subsystem 202. As shown in FIG. 4, software application subsystem 202 may include a communication facility 402, a connection management facility 404, a messaging facility 406, and a storage facility 408, which may be in communication with one another using any suitable communication technologies.

Communication facility 402 may be configured to facilitate communication between software application subsystem 202 and message broker subsystem 204. For example, communication facility 402 may be configured to establish and/or assist in establishing one or more connections between software application subsystem 202 and message broker subsystem 204 over which one or more messages may be transmitted from software application subsystem 202 to message broker subsystem 204 and/or from message broker subsystem 204 to software application subsystem 202. The one or more connections established between software application subsystem 202 and message broker subsystem 204 may include any type of connection as described herein.

Communication facility 402 may additionally or alternatively be configured to facilitate communication between software application subsystem 202 and global directory service subsystem 206. For example, if system 100 is configured to utilize a de-centralized connection distribution heuristic, communication facility 402 may be configured to transmit a request to GDS subsystem 206 for cluster information identifying each broker included in a cluster of brokers and broker information associated with each broker included in the cluster of brokers (i.e., location information that will allow software application subsystem 202 to locate and connect to each particular broker). Alternatively, if system 100 is configured to utilize a centralized connection distribution heuristic, communication facility 402 may transmit to GDS subsystem 206 a request provided by a software application for the software application to connect to any one of a plurality of brokers included in a cluster of brokers. This request may include a name of the cluster of brokers to which the software application is to connect.

Connection management facility 404 may be configured to at least partially implement connection management facility 104. For example, if system 100 is configured to utilize a de-centralized connection distribution heuristic, connection management facility 404 may acquire and locally store cluster and broker information from GDS subsystem 206. By locally storing the cluster and broker information (e.g., storing data representative of the cluster and broker information in a local cache), connection management facility 404 may use the stored information to dynamically identify and connect to a broker without having to consult with GDS subsystem 206 each time the software application provides a request to establish a new connection with a broker included in the cluster of brokers. An example of this will be described in more detail below.

Connection management facility 404 may be further configured to attempt to establish a connection between the software application and a broker identified (either by connection management facility 404 or by GDS subsystem 206) as being available for connection to the software application. This may be performed in any of the ways described herein.

Messaging facility 406 may be configured to process a message generated by an originating software application and/or a message received by a recipient software application. Exemplary, but not exclusive, processing of a message that may be performed by messaging facility 406 includes encrypting a message, decrypting a message, preparing a message for transmission to a recipient software application via message broker subsystem 204, processing of a message received from message broker subsystem 204, etc. Messaging facility 406 may be further configured to transmit (e.g., direct communication facility 402 to transmit) one or more messages to one or more recipient software applications.

Storage facility 408 may be configured to maintain cluster data 410, broker data 412, message data 414, and API data 416. It will be recognized that storage facility 408 may maintain additional or alternative data as may serve a particular implementation.

Figure 5:
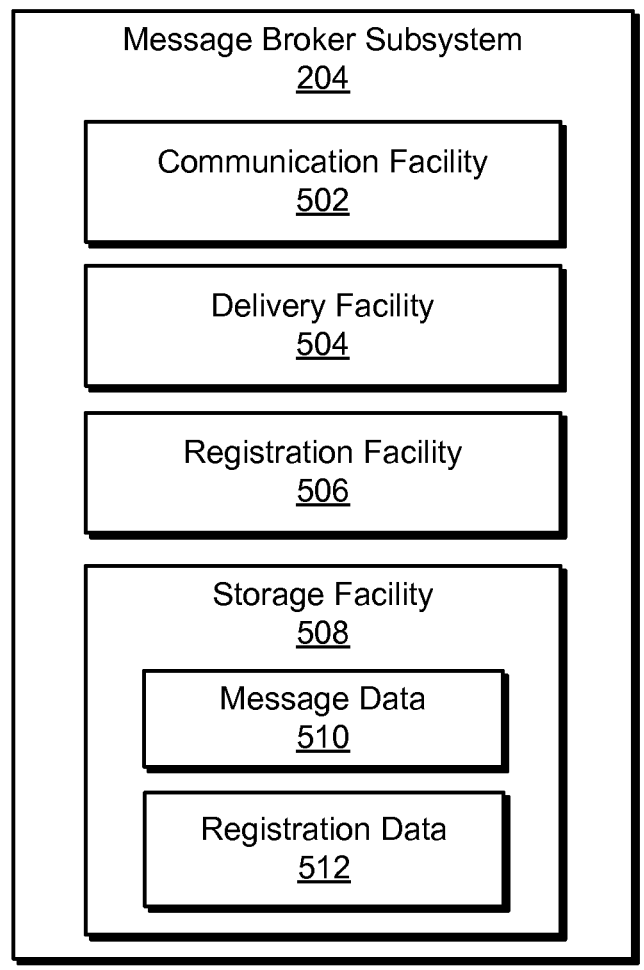
FIG. 5 illustrates exemplary components of a message broker subsystem according to principles disclosed herein.

FIG. 5 illustrates exemplary components of message broker subsystem 204. As mentioned, message broker subsystem 204 may be implemented by one or more brokers organized into one or more clusters of brokers. A cluster of brokers may include any number of brokers located at any distinct physical location as may serve a particular implementation. Moreover a particular broker may be a part of one or more clusters at any given time. For example, a particular broker may be a part of two different clusters of brokers at the same time.

As shown in FIG. 5, message broker subsystem 204 may include a communication facility 502, a delivery facility 504, a registration facility 506, and a storage facility 508, which may be in communication with one another using any suitable communication technologies. Each of these facilities will now be described.

Communication facility 502 may be configured to facilitate communication between message broker subsystem 204 and software application subsystem 202. For example, communication facility 502 may be configured to establish and/or assist in establishing one or more connections between message broker subsystem 204 and software application subsystem 202 over which one or more messages may be transmitted from software application subsystem 202 to message broker subsystem 204 and/or from message broker subsystem 204 to software application subsystem 202. In some examples, communication facility 204 may be configured to receive a message intended for delivery to a recipient software application by way of one of the established one or more connections.

Communication facility 502 may additionally or alternatively be configured to facilitate communication between message broker subsystem 204 and GDS subsystem 206. For example, communication facility 502 may be configured to transmit registration data associated with one or more brokers included in one or more clusters of brokers and/or any other data to GDS subsystem 206 as may serve a particular implementation.

Delivery facility 504 may be configured to deliver (and/or attempt to deliver) one or more messages received from one or more originating software applications to one or more recipient software applications in accordance with delivery instructions included within the message(s). To this end, delivery facility 504 may be configured to utilize one or more connections established by communication facility 502.

Registration facility 506 may be configured to register a software application with message broker subsystem 204. For example, communication facility 502 may receive a request from a software application to be either statically (i.e., permanently) or dynamically (i.e., temporarily) registered with a broker. Registration facility 506 may authenticate the request in any suitable manner. For example, registration facility 506 may verify a correct name, user identification ("user ID"), and/or password included in the request received from the software application. In response to a successful authentication, registration facility 506 may transmit the name and/or user ID to GDS subsystem 206 so that GDS subsystem 206 may maintain a record of the registration.

Registration facility 506 may be further configured to register a particular broker with a particular cluster of brokers. For example, registration facility 506 may add a broker to a cluster of brokers. In response, registration facility 506 may transmit the name of the broker to GDS subsystem 206 and indicate that the broker is now registered with the cluster of brokers. In this manner, GDS subsystem 206 may maintain a current list of all the brokers included in the cluster.

Storage facility 508 may be configured to maintain message data 510 representative of one or more messages to be delivered to a recipient software application and registration data 512 representative of data utilized by registration facility 506. Storage facility 508 may maintain additional or alternative data as may serve a particular implementation.

Figure 6:
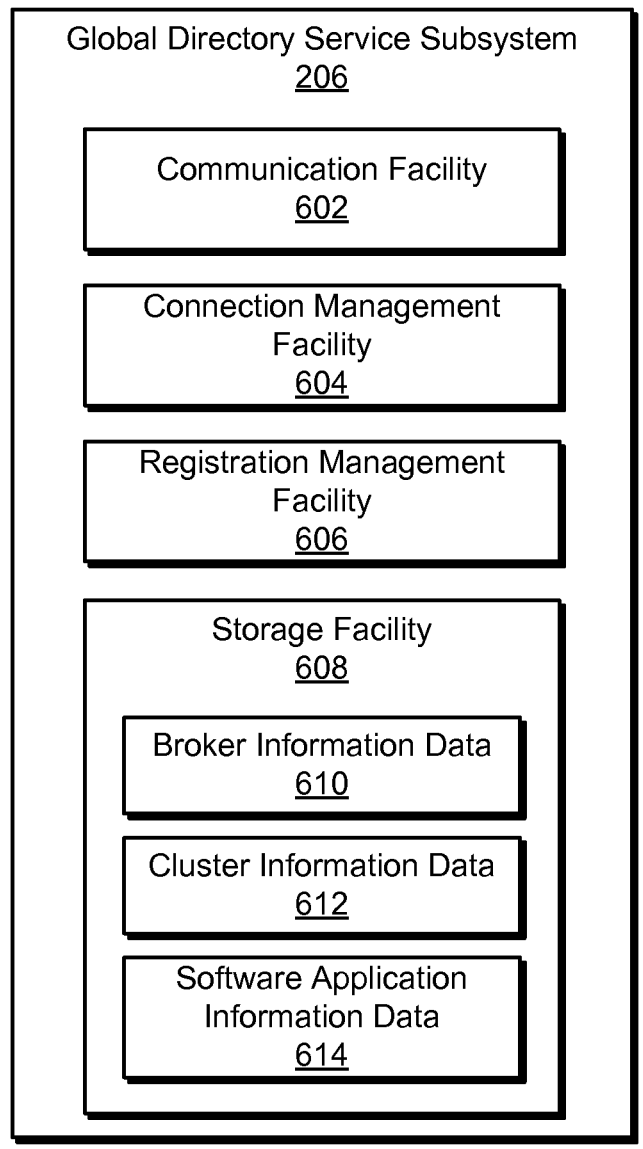
FIG. 6 illustrates exemplary components of a global directory service subsystem according to principles disclosed herein.

FIG. 6 illustrates exemplary components of GDS subsystem 206. As shown in FIG. 6, GDS subsystem 206 may include a communication facility 602, a connection management facility 604, a registration management facility 606, and a storage facility 608, which may be in communication with one another using any suitable communication technologies.

Communication facility 602 may be configured to facilitate communication between GDS subsystem 206 and software application subsystem 202. For example, if system 100 is configured to utilize a de-centralized connection distribution heuristic, communication facility 602 may receive a request from software application subsystem 202 for cluster and broker information so that software application subsystem 202 may identify a broker with which a software application may connect. Alternatively, if system 100 is configured to utilize a centralized connection distribution heuristic, communication facility 602 may receive a request provided by a software application for the software application to connect to any one of a plurality of brokers included in a cluster of brokers.

Communication facility 602 may be further configured to facilitate communication between GDS subsystem 206 and message broker subsystem 204. For example, communication facility 602 may receive registration data from message broker subsystem 204.

Connection management facility 604 may be configured to at least partially implement connection management facility 104. For example, if system 100 is configured to utilize a de-centralized connection distribution heuristic, connection management facility 604 may be configured to provide cluster and broker information to software application subsystem 202 for local storage by software application subsystem 202. Alternatively, connection management facility 604 may use a centralized connection distribution heuristic to dynamically identify a broker that is available for connection and then direct communication facility 602 to transmit broker information associated with the identified broker to software application subsystem 202.

Registration management facility 606 may be configured to perform any registration management operation associated with one or more brokers and/or software applications. For example, registration management facility 606 may be configured to manage (e.g., maintain, store, update, receive, transmit, etc.) broker information, cluster information, and/or software application information.

To illustrate, FIG. 7 shows an exemplary broker information table 700 comprising broker information data that may be maintained by GDS subsystem 206. The broker information data may be maintained in the form of a look-up table, in a database, and/or in any other manner as may serve a particular implementation.

As shown, broker information table 700 may include a list of broker names, location IP addresses, and location port numbers associated with each of a plurality of brokers implementing message broker subsystem 204. The information included within broker information table 700 may be accessed by one or more message brokers and/or software applications to determine appropriate delivery instructions for messages to be transmitted from one software application to another.

Figure 8:
FIG. 8 shows an exemplary cluster information table according to principles disclosed herein.

FIG. 8 shows an exemplary cluster information table 800 comprising cluster information data that may be maintained by GDS subsystem 206. The cluster information data may be maintained in the form of a look-up table, in a database, and/or in any other manner as may serve a particular implementation.

As shown, cluster information table 800 may include a list of cluster names and names of various brokers included in each cluster. For example, a cluster named "cluster A" has three brokers included therein (i.e., "broker A," "broker B," and "broker C."). As mentioned, a particular broker may be included in more than one cluster. For example, the broker named "broker A" is included in both cluster A and cluster B. The information included within cluster information table 800 may be used by connection management facility 104 to identify a particular broker that is available for connection to a software application.

FIG. 9 shows an exemplary software application information table 900 comprising software application information data that may be maintained by GDS subsystem 206. The software application information data may be maintained in the form of a look-up table, in a database, and/or in any other manner as may serve a particular implementation.

As shown in FIG. 9, table 900 indicates a current registration type (e.g., static or dynamic) of a plurality of software applications each currently registered with (e.g., connected to) one of a plurality of brokers. In the example of FIG. 9, three software applications (i.e., applications AZ, AY, and AX) are each currently registered with one of three brokers included in a cluster of brokers (i.e., cluster A).

Table 900 may also indicate a total number of established connections between a software application and the brokers included in a particular cluster. For example, table 900 indicates that application AX currently has multiple established connections (represented by −1, −2, −3, etc.) with the brokers included in cluster A. To illustrate, table 900 indicates that application AX currently has nine established connections with the brokers included in cluster A. Four of these connections (i.e., connections AX-1, AX-4, AX-5, and AX-8) are with broker A, three of these connections (i.e., connections AX-2, AX-6, and AX-9) are with broker B, and two of these connections (i.e., connections AX-3 and AX-7) are with broker C.

Registration management facility 606 may dynamically update any of tables 700, 800, and 900 in response to registration data transmitted thereto by software application subsystem 202 and/or message broker subsystem 204. For example, each time application AX establishes a new connection with one of brokers A, B, and C, software application information table 900 may be updated accordingly.

Returning to FIG. 6, storage facility 608 may be configured to maintain broker information data 610 (e.g., information that may be included in broker information table 700), cluster information data 612 (e.g., information that may be included in cluster information table 800), software application information data 614 (e.g., information that may be included in software application information table 900), and/or any other data as may serve a particular implementation.

In some examples, GDS subsystem 206 may be implemented by multiple GDS servers. Each server may be located at a distinct location, for example. In some examples, the data maintained by each GDS server may be synchronized so that each GDS server always has current registration data associated with each software application and message broker that is a part of system 100.

Figure 10:
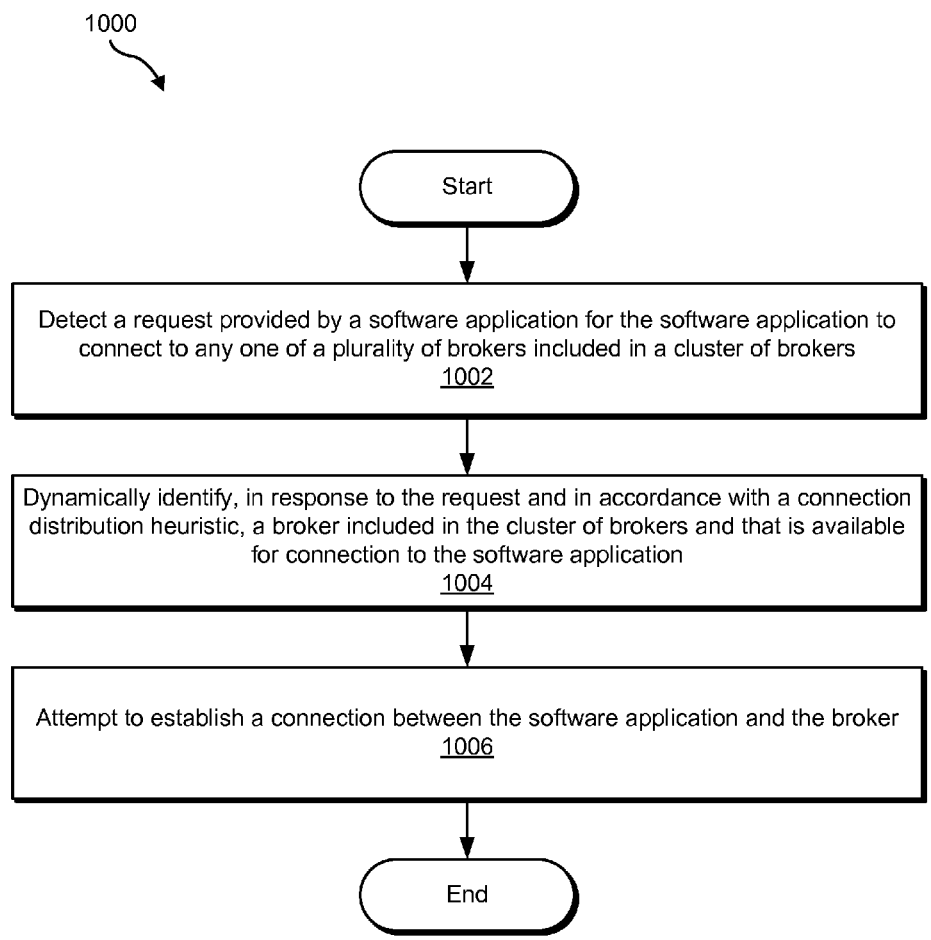
FIGS. 10-12 illustrate exemplary methods of dynamically establishing a connection between a software application and a cluster of brokers according to principles disclosed herein.

FIG. 10 illustrates an exemplary method 1000 of dynamically establishing a connection between a software application and a cluster of brokers. While FIG. 10 illustrates exemplary steps according to one embodiment, other embodiments may omit, add to, reorder, and/or modify any of the steps shown in FIG. 10. One or more steps of method 1000 may be performed by system 100, software application subsystem 202, and/or message broker subsystem 204.

In step 1002, a broker-based messaging system detects a request provided by a software application for the software application to connect to any one of a plurality of brokers included in a cluster of brokers. Step 1002 may be performed in any of the ways described herein.

In step 1004, the broker-based messaging system dynamically identifies, in response to the request and in accordance with a connection distribution heuristic, a broker included in the cluster of brokers and that is available for connection to the software application. Step 1004 may be performed in any of the ways described herein.

In step 1006, the broker-based messaging system attempts to establish a connection between the software application and the broker. Step 1006 may be performed in any of the ways described herein.

Figure 11:
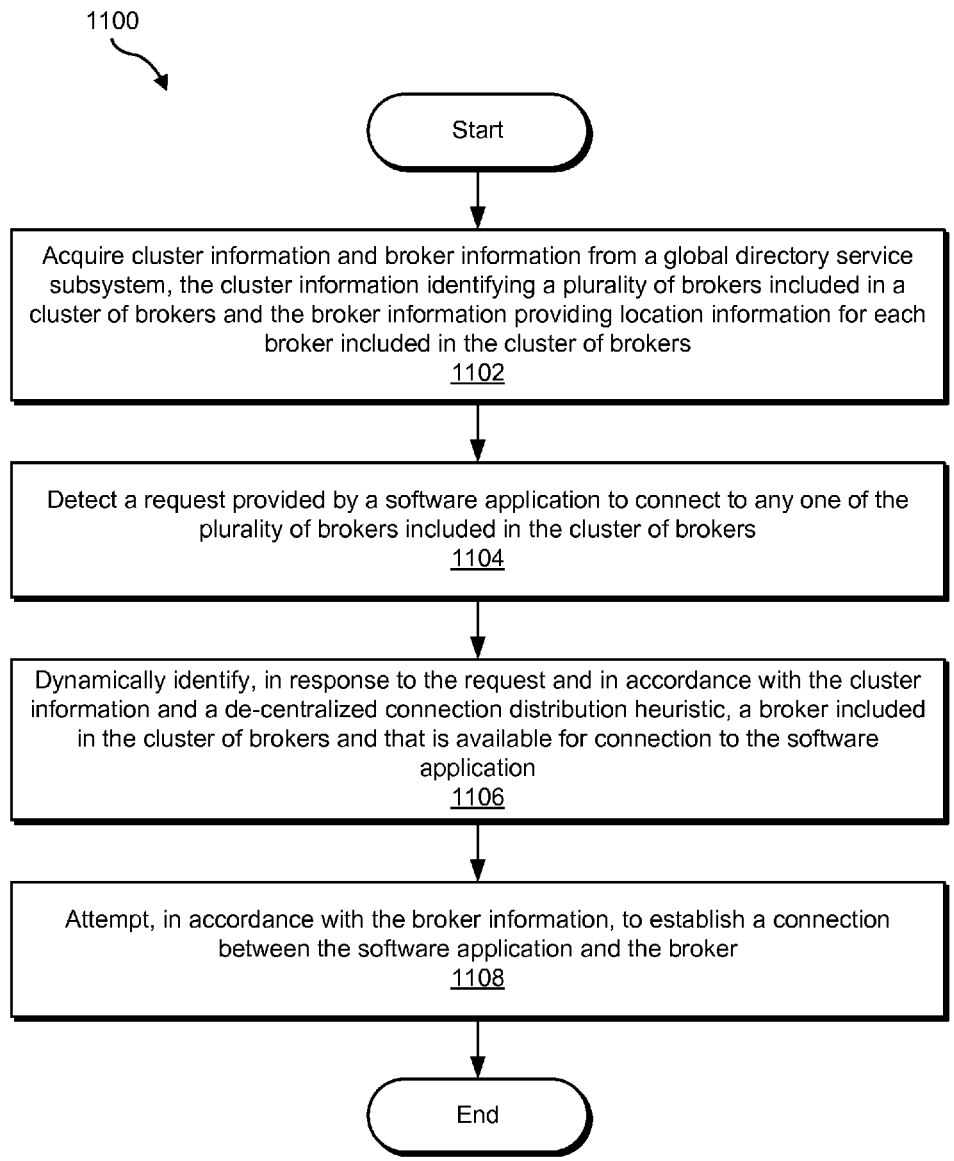

FIG. 11 illustrates an exemplary method 1100 of dynamically establishing a connection between a software application that utilizes a de-centralized connection distribution heuristic. While FIG. 11 illustrates exemplary steps according to one embodiment, other embodiments may omit, add to, reorder, and/or modify any of the steps shown in FIG. 11. Method 1100 may be performed by software application subsystem 202 (e.g., a computing device executing a software application).

In step 1102, a software application subsystem acquires cluster information and broker information from a global directory service subsystem. As described above, the cluster information may identify a plurality of brokers included in a cluster of brokers and the broker information may provide location information for each broker included in the cluster of brokers. Step 1102 may be performed in any of the ways described herein.

In step 1104, the software application subsystem detects a request provided by a software application to connect to any one of the plurality of brokers included in the cluster of brokers. Step 1104 may be performed in any of the ways described herein.

In step 1106, the software application subsystem dynamically identifies, in response to the request and in accordance with the cluster information and a de-centralized connection distribution heuristic, a broker included in the cluster of brokers and that is available for connection to the software application. Step 1106 may be performed in any of the ways described herein.

In step 1108, the software application subsystem attempts, in accordance with the broker information, to establish a connection between the software application and the broker. Step 1108 may be performed in any of the ways described herein.

Figure 12:
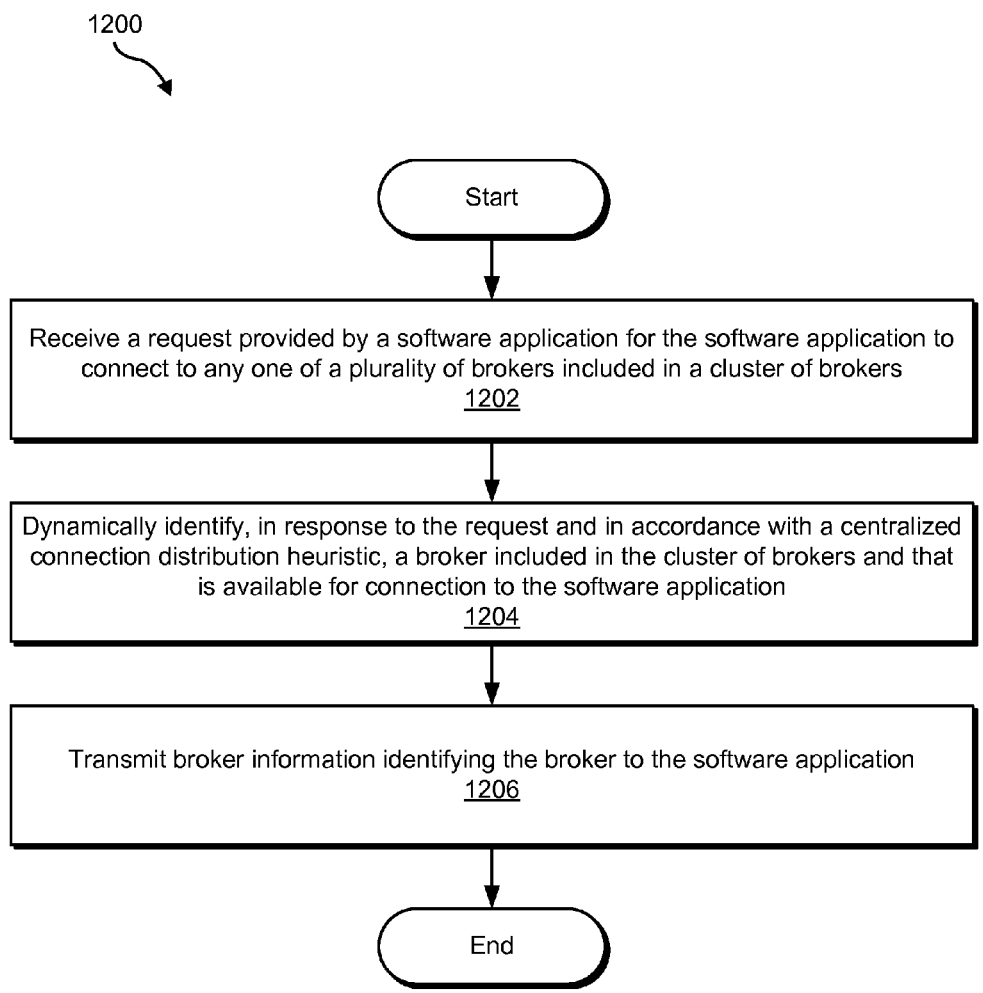

FIG. 12 illustrates an exemplary method 1200 of dynamically establishing a connection between a software application that utilizes a centralized connection distribution heuristic. While FIG. 12 illustrates exemplary steps according to one embodiment, other embodiments may omit, add to, reorder, and/or modify any of the steps shown in FIG. 12. Method 1200 may be performed by GDS subsystem 206.

In step 1202, a GDS subsystem receives a request provided by a software application for the software application to connect to any one of a plurality of brokers included in a cluster of brokers. Step 1202 may be performed in any of the ways described herein. For example, the GDS subsystem may receive the request from an API associated with the software application.

In step 1204, the GDS subsystem dynamically identifies, in response to the request and in accordance with a centralized connection distribution heuristic, a broker included in the cluster of brokers and that is available for connection to the software application. Step 1204 may be performed in any of the ways described herein.

In step 1206, the GDS subsystem transmits broker information identifying the broker to the software application. The software application (i.e., a computing device executing the software application) may then use the broker information to attempt to connect to the identified broker. Step 1206 may be performed in any of the ways described herein.

Specific implementations and examples of the methods and systems described herein will now be described in connection with FIGS. 13-14. It will be recognized that the implementations and examples described in connection with FIGS. 13-14 are merely illustrative of the many possible implementations and examples of the methods and systems described herein.

Figure 13:
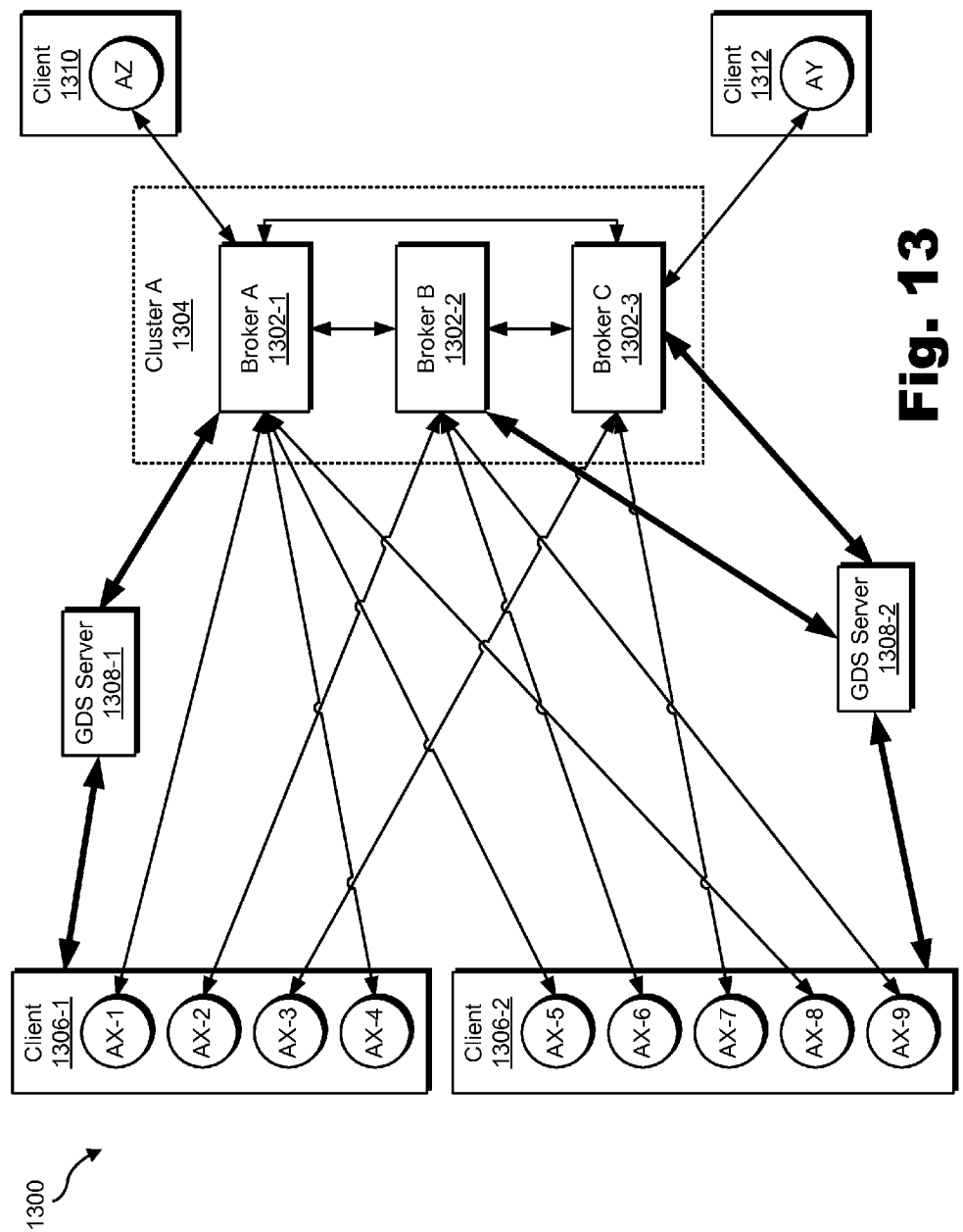
FIG. 13 illustrates an exemplary de-centralized connection distribution heuristic according to principles disclosed herein.
Figure 14:
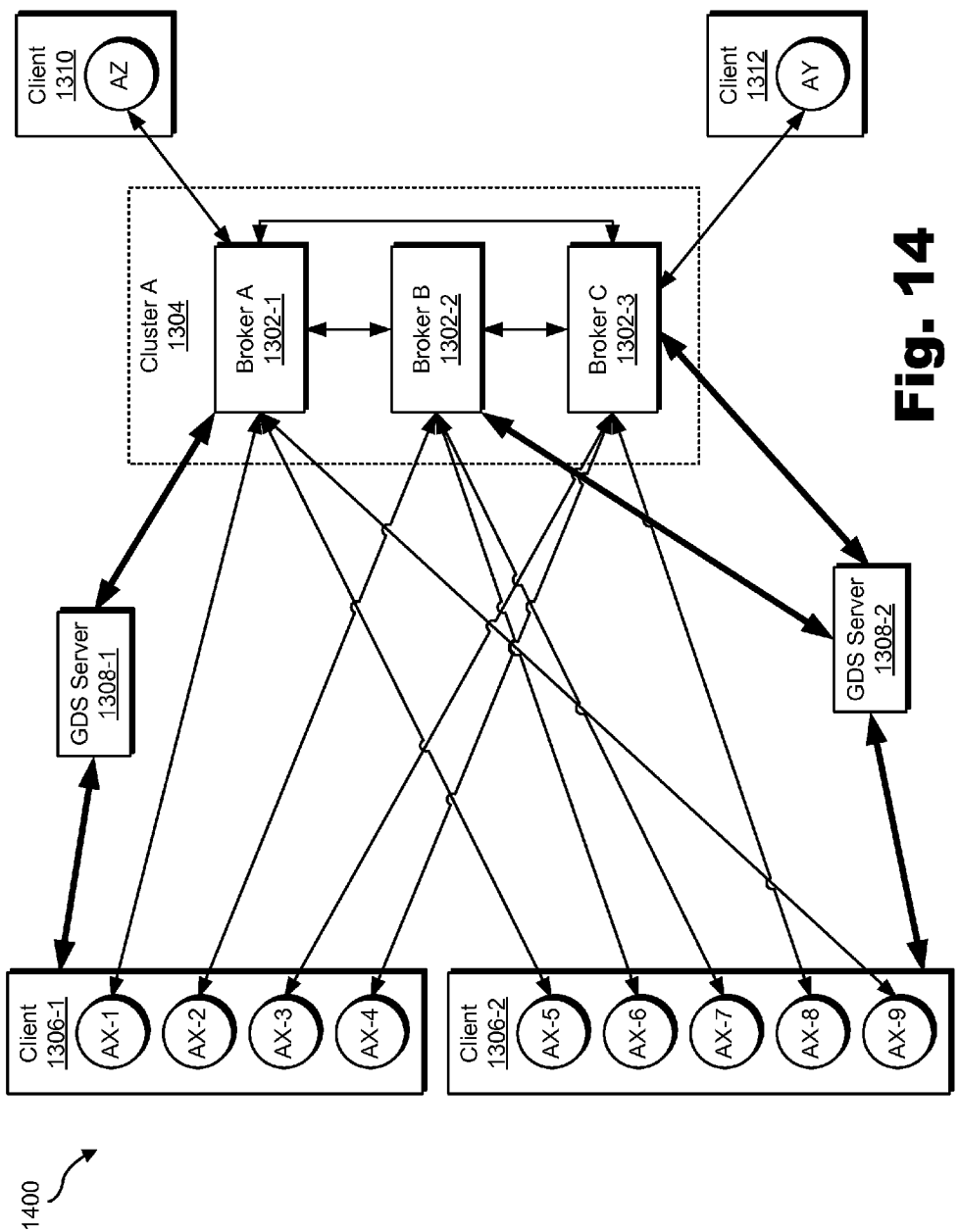
FIG. 14 illustrates an exemplary centralized connection distribution heuristic according to principles disclosed herein.

FIG. 13 shows an exemplary implementation 1300 of system 100 wherein a de-centralized connection distribution heuristic is used to distribute multiple connections initiated by software application AX (i.e., the software application AX listed in software application information table 900) among a plurality of brokers 1302 (i.e., brokers 1302-1 through 1302-3, also referred to herein as brokers A, B, and C) included in a predetermined cluster 1304. As shown, software application AX resides on and is executed by both a first client 1306-1 and a second client 1306-2 (referred to herein as "clients 1306"). Each client 1306 may include any suitable computing device. It will be recognized that the various instances of software application AX (i.e., AX-1 through AX-9) shown in FIG. 13 are meant to represent individual connections established between software application AX and the brokers included in cluster A.

As shown, client 1306-1 is configured to communicate with a first GDS server 1308-1 and client 1306-2 is configured to communicate with a second GDS server 1308-2. As described above, GDS servers 1308-1 and 1308-2 (collectively "GDS servers 1308") may be synchronized so that they always have current registration data associated with each software application and message broker that is a part of system 100.

FIG. 13 also shows that software application AZ (i.e., the software application AZ listed in software application information table 900) resides on and is executed by a third client 1310 and that software application AY (i.e., the software application AY listed in software application information table 900) resides on and is executed by a fourth client 1312. For purposes of this example, software application AZ is statically connected to broker A and software application AY is statically connected to broker B.

In some examples, each client 1306 may independently use a de-centralized connection distribution heuristic to distribute connections requested by software application AX among brokers A, B, and C.

To illustrate, client 1306-1 may initially (or at any other point in time) acquire and locally cache cluster information associated with cluster A and broker information associated with the brokers included in cluster A (i.e., brokers A, B, and C). Client 1306-1 may then detect a request provided by software application AX to connect to any of the brokers included in cluster A. As described above, the connection request may include the name of cluster A.

In response to the request, client 1306-1 (i.e., one or more APIs executed by client 1306-1) may use a de-centralized connection distribution heuristic to select a broker that is available for connection to software application AX. The de-centralized connection distribution heuristic may include any suitable heuristic that attempts to distribute connections initiated by software application AX among the brokers included in cluster A. For example, the de-centralized connection distribution heuristic may include a round-robin load balancing heuristic that identifies a "next available" broker for connection to software application AX. In other words, client 1306-1 may rotate through the available brokers in a specified order and select the next available broker for connection to software application AX.

Hence, as shown in FIG. 13 and in software application information table 900, client 1306-1 may establish a first connection (e.g., connection AX-1) with broker A in response to a first connection request provided by software application AX, a second connection (e.g., connection AX-2) with broker B in response to a second connection request provided by software application AX, a third connection (e.g., connection AX-3) with broker C in response to a third connection request provided by software application AX, and a fourth connection (e.g., connection AX-4) with broker A in response to a fourth connection request provided by software application AX.

Client 1306-2 may go through a similar, yet independent, process for connections AX-5 through AX-9. Hence, as shown in FIG. 13 and in software application information table 900, client 1306-2 may establish a fifth connection (e.g., connection AX-5) with broker A in response to a fifth connection request provided by software application AX, a sixth connection (e.g., connection AX-6) with broker B in response to a first connection request provided by software application AX, a seventh connection (e.g., connection AX-7) with broker C in response to a seventh connection request provided by software application AX, an eighth connection (e.g., connection AX-8) with broker A in response to an eighth connection request provided by software application AX, and a ninth connection (e.g., connection AX-9) with broker B in response to a ninth connection request provided by software application AX.

With the connections thus established, software application AX may concurrently transmit messages to one or more recipient software applications. For example, software application AX may utilize connection AX-1 to communicate with software application AZ and connection AX-2 to communicate with software application AY.

As mentioned, one benefit of the de-centralized connection distribution heuristics described herein is that clients 1306 may select brokers for connection to software application AX without having to consult with GDS servers 1308-1 and/or 1308-2 each time a new connection request is detected. This conserves both time and resources. However, because each client 1306 may independently implement the de-centralized connection distribution heuristics described herein, overall distribution of connections may not be exactly uniform. To illustrate, in the example of FIG. 13, broker A has four connections to software application AX, broker B has three connections to software application AX, and broker C has two connections to software application AX.

Hence, in some alternative embodiments, a centralized connection distribution heuristic may be used to evenly distribute connections among the brokers included in cluster A.

It will be recognized that the decision to use a de-centralized connection distribution heuristic or a centralized connection distribution heuristic may be made manually by a user associated with system 100, automatically by system 100 in response to a resource availability, or any other suitable manner as may serve a particular implementation.

An exemplary implementation 1400 of system 100 in which a centralized connection distribution heuristic is employed is illustrated in FIG. 14. The components shown in FIG. 14 are the same as those shown in FIG. 13. However, in the example of FIG. 14, GDS servers 1308 are configured to use a centralized connection distribution heuristic to distribute connections requested by software application AX among brokers A, B, and C. In other words, each time software application AX needs to establish another connection with any one of the brokers included in cluster A, one of clients 1306 transmits a connection request provided by software application AX to either GDS server 1308. The recipient GDS server 1308 may then use a centralized connection distribution heuristic to select a broker that is available for connection to software application AX. As with the de-centralized connection distribution heuristic, the centralized connection distribution heuristic may include any suitable heuristic that attempts to distribute connections initiated by software application AX among the brokers included in cluster A. For example, the centralized connection distribution heuristic may include a round-robin load balancing heuristic that identifies a "next available" broker for connection to software application AX. In other words, the recipient GDS server 1308 may rotate through the available brokers in a specified order and select the next available broker for connection to software application AX.

Hence, as shown in FIG. 14, connections AX-1 through AX-9 are evenly distributed among the brokers included in cluster A. To illustrate, brokers A, B, and C each have three connections to software application AX.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 15:
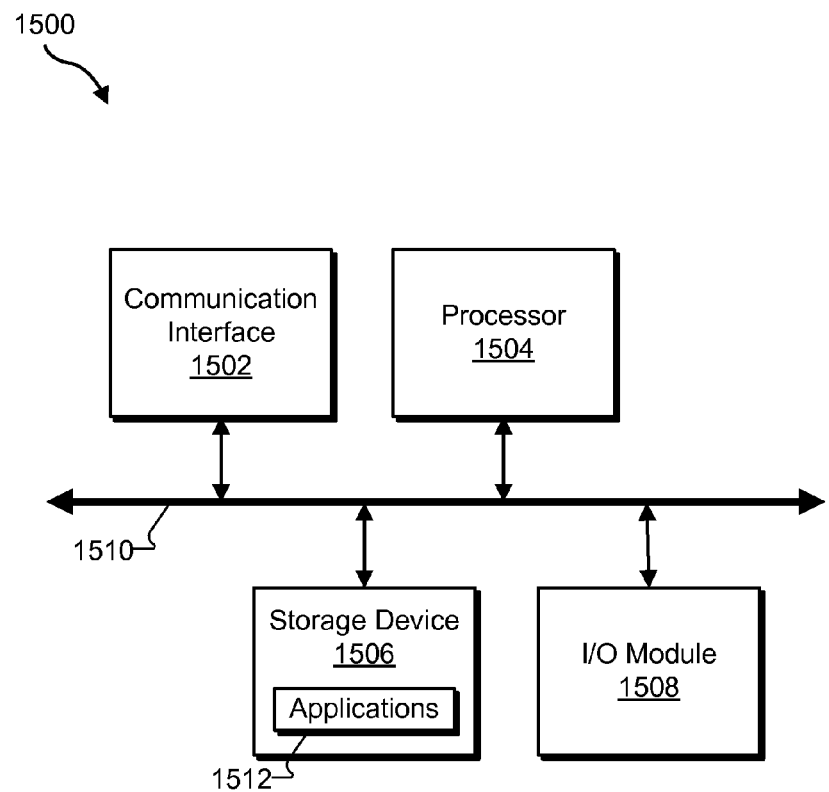
FIG. 15 illustrates an exemplary computing device according to principles disclosed herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1506. For example, data representative of one or more executable applications 1512 (which may include, but are not limited to, one or more of the software applications described herein) configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with detection facility 102, connection management facility 104, communication facility 402, connection management facility 404, messaging facility 406, communication facility 502, delivery facility 504, registration facility 506, communication facility 602, connection management facility 604, and/or registration management facility 606. Likewise, storage facility 106, storage facility 408, storage facility 508, and/or storage facility 608 may be implemented by or within storage device 1506.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    transmitting, by a client computing device by way of a network, an information request for cluster information and broker information to a global directory service subsystem located remotely from the client computing device, the cluster information identifying a plurality of brokers included in a cluster of brokers that are located remotely from the client computing device and the global directory service subsystem and the broker information providing location information for each broker included in the cluster of brokers;
    acquiring, by the client computing device by way of the network and in response to the information request, the cluster information and the broker information from the global directory service subsystem;
    storing, by the client computing device, data representative of the acquired cluster information and the acquired broker information within a local cache;
    detecting, by the client computing device subsequent to the storing, a request provided by a software application residing on and executed by the client computing device to connect to any one of the plurality of brokers included in the cluster of brokers;
    dynamically identifying, by the client computing device in response to the request and in accordance with the stored data and a de-centralized connection distribution heuristic that includes load balancing, a broker included in the cluster of brokers and that is available for connection to the software application; and
    attempting, by the client computing device in accordance with the broker information, to establish a connection between the software application and the broker.

2. The method of claim 1, further comprising:
    determining, by the client computing device, that the attempt to establish the connection between the software application and the broker is unsuccessful;
    dynamically identifying, by the client computing device in response to the determining and in accordance with the de-centralized connection distribution heuristic, another broker included in the cluster of brokers and that is available for connection to the software application; and
    attempting, by the client computing device, to establish a second connection between the software application and the another broker.

3. The method of claim 1, wherein the request comprises data identifying a name of the cluster of brokers.

4. The method of claim 1, wherein the attempt to establish the connection between the software application and the broker is successful, and wherein the method further comprises:

transmitting, by the client computing device by way of the connection and the broker, a message from the software application to a recipient software application.

5. The method of claim 1, wherein the connection is a synchronous connection.

6. The method of claim 1, wherein each broker included in the cluster of brokers is located at a distinct physical location.

7. The method of claim 1, embodied as computer-executable instructions on at least one non-transitory computer-readable medium.

8. The method of claim 1, further comprising periodically acquiring, by the client computing device, updated cluster information and updated broker information from the global directory service subsystem.

9. The method of claim 1, wherein the dynamically identifying the broker in accordance with the de-centralized connection distribution heuristic comprises utilizing a round-robin load balancing heuristic to identify the broker.

10. The method of claim 1, further comprising:
determining, by the client computing device, that the attempt to establish the connection between the client computing device and the broker is successful; and
allowing, by the client computing device in response to the determining, the software application to transmit one or more messages by way of the established connection.

11. The method of claim 1, wherein the attempt to establish the connection between the software application and the broker is successful, and wherein the method further comprises:
detecting, by the client computing device while the software application is connected to the broker, an additional request provided by the software application to connect to any one of the plurality of brokers included in the cluster of brokers;
dynamically identifying, by the client computing device in response to the additional request and in accordance with the broker information and the de-centralized connection distribution heuristic, an additional broker included in the cluster of brokers and that is available for connection to the software application; and
attempting, by the client computing device while the software application is connected to the broker, to establish an additional connection between the software application and the additional broker.

12. The method of claim 1, embodied as computer-executable instructions on at least one non-transitory computer-readable medium.

13. A method comprising:
receiving, by a global directory service subsystem by way of a network, an information request for cluster information and broker information from a client computing device located remotely from the global directory service subsystem, the cluster information identifying a plurality of brokers included in a cluster of brokers that are located remotely from the client computing device and the global directory service subsystem and the broker information providing location information for each broker included in the cluster of brokers;
transmitting, by the global directory service subsystem by way of the network, the cluster information and the broker information to the client computing device;
detecting, by the client computing device, a request provided by a software application residing on and executed by the client computing device for the software application to connect to any one of a plurality of brokers included in a cluster of brokers; and
dynamically identifying, by the client computing device in response to the request and in accordance with the cluster information and the broker information transmitted by the global directory service subsystem, a broker included in the cluster of brokers and that is available for connection to the software application.

14. The method of claim 13, further comprising:
attempting, by the client computing device, to establish a connection between the software application and the broker.

15. The method of claim 13, embodied as computer-executable instructions on at least one non-transitory computer-readable medium.

16. A system comprising:
a client computing device that
transmits, by way of a network, an information request for cluster information and broker information to a global directory service subsystem located remotely from the client computing device, the cluster information identifying a plurality of brokers included in a cluster of brokers that are located remotely from the client computing device and the global directory service subsystem and the broker information providing location information for each broker included in the cluster of brokers,
acquires, by way of the network and in response to the information request, the cluster information and the broker information from the global directory service subsystem,
stores data representative of the acquired cluster information and the acquired broker information within a local cache,
detects a request provided by a software application residing on and executed by the client computing device for the software application to connect to any one of a plurality of brokers included in the cluster of brokers,
dynamically identifies, in response to the request and in accordance with the stored data and a de-centralized connection distribution heuristic that includes load balancing, a broker included in the cluster of brokers and that is available for connection to the software application, and
attempts to establish a connection between the software application and the broker.

\* \* \* \* \*